US005653793A

United States Patent [19]
Ott et al.

[11] Patent Number: 5,653,793
[45] Date of Patent: *Aug. 5, 1997

[54] TIO₂ SLURRY PROCESS

[75] Inventors: Michael Warren Ott; Rajeev Lochan Gorowara, both of Newark, Del.; Robert William Johnson, Kennett Square, Pa.

[73] Assignee: E. I. Du Pont de Nemours and Company, Wilmington, Del.

[*] Notice: The term of this patent shall not extend beyond the expiration date of Pat. No. 5,356,470.

[21] Appl. No.: 648,636

[22] Filed: May 13, 1996

Related U.S. Application Data

[63] Continuation-in-part of Ser. No. 510,116, Aug. 1, 1995, abandoned.

[51] Int. Cl.⁶ .................................................. C09C 1/36
[52] U.S. Cl. ........................................ 106/437; 106/436
[58] Field of Search ................................. 106/437, 436

[56] References Cited

U.S. PATENT DOCUMENTS

| | | | |
|---|---|---|---|
| 3,505,091 | 4/1970 | Santos | 106/437 |
| 4,042,557 | 8/1977 | Dills | 524/234 |
| 4,214,913 | 7/1980 | Glaeser | 106/437 |
| 4,462,979 | 7/1984 | Stevens et al. | 423/613 |
| 4,661,322 | 4/1987 | Hill et al. | 422/158 |
| 4,842,651 | 6/1989 | Ravet et al. | 106/487 |
| 4,937,064 | 6/1990 | Gonzalez | 423/613 |
| 4,978,396 | 12/1990 | Story | 106/436 |
| 5,082,498 | 1/1992 | Kurtz et al. | 106/499 |
| 5,201,949 | 4/1993 | Allen et al. | 106/436 |
| 5,318,624 | 6/1994 | Corbin | 106/447 |
| 5,356,470 | 10/1994 | Ott et al. | 106/437 |
| 5,393,510 | 2/1995 | Blumel et al. | 423/610 |

OTHER PUBLICATIONS

Perry, Robert H., Perry's Chemical Engineer's Handbook Sixth Edition, 8-30-8-46, 1984 (No Month Available).

*Primary Examiner*—Mark L. Bell
*Assistant Examiner*—Scott L. Hertzog
*Attorney, Agent, or Firm*—Daniel W. Sullivan

[57] ABSTRACT

A process for enhancing the optical efficiency of TiO₂ slurries is disclosed.

15 Claims, No Drawings

TIO₂ SLURRY PROCESS

CROSS REFERENCE TO RELATED APPLICATION

This application is a continuation-in-part of U.S. Pat. application Ser. No. 08/510,116, filed Aug. 1, 1995, abandoned.

BACKGROUND OF THE INVENTION

This invention relates to the preparation of titanium dioxide in an aqueous slurry and more particularly an improved slurry suitable for production of paper or paperboard applications having enhanced optical properties.

Certain finishing steps are required to be performed on conventional $TiO_2$ slurries such as filtering, washing, drying, micronizing and reslurrying. Conventional finishing steps are more expensive and laborious. Conventional slurries are prepared using pigment that has been micronized so the particles are relatively easy to disperse in water. Base $TiO_2$ as defined hereinbelow is highly aggregated and agglomerated. If the solids concentration is high, the viscosity becomes too high and dry base $TiO_2$ particles cannot be readily incorporated into the slurry. Heretofore, base $TiO_2$ has not been used to directly process a slurry at greater than 83% solids concentration. For example, U.S. Pat. No. 5,356,470 describes a slurry process operating at 79–83% solids content and a process for media milling pigment slurries to eliminate or reduce oversize particles with a particle size distribution between 10–44 microns for enhanced smoothness of paper and paperboard applications. No mention is made therein regarding opacity or a uniform, narrow particle size distribution of smaller particles. One important property of $TiO_2$ is its ability to opacify.

An efficient, economical process that directly produces a slurry with a narrow particle size distribution by operating at a high solids concentration with dry base $TiO_2$ particles readily incorporated into the slurry is therefore needed. Concomitantly, there is a need to produce an aqueous $TiO_2$ slurry with-improved optical efficiency. The present invention meets these needs.

SUMMARY OF THE INVENTION

In accordance with this invention there is provided a process for preparing an improved $TiO_2$ slurry directly from base $TiO_2$ comprising viscous shear processing of base $TiO_2$ particles having less than about 65 weight % greater than 0.6 microns, at a solids content of above about 83% by weight, so as to achieve deagglomeration and dispersion of the slurry, while still permitting sufficient fluidity to permit incorporation of the particles into the slurry. Alternatively, viscous shear processing may also be carried out at lower % solids content at higher shear rates. The slurry may be subjected to polishing grind and dispersion.

The process is characterized by the following advantages which cumulatively render this process preferable to processes previously employed:

1. $TiO_2$ slurry particles having a narrow particle size distribution;

2. improved optical efficiency of the $TiO_2$;

3. elimination/reduction of conventional finishing steps;

4. may be operated continuously to give greatly increased production capacity, more efficient equipment use, and lower cost operation; and 5. improved rheological properties.

It has been found that the process of this invention is more efficient and more economical over the processes found in the prior art. Concomitantly, the present process produces product of improved quality and enhanced value in use.

DETAILED DESCRIPTION

Base Pigment Manufacture.

The $TiO_2$ used to prepare the pigment can be of a conventional ruffle or anatase variety, produced by either a chloride or a sulfate process. The chloride process for producing $TiO_2$ pigment by reacting oxygen-containing gas, $TiCl_4$ and $AlCl_3$ (in amount sufficient to form 0.1–1.5% $Al_2O_3$) in a vapor phase is known. The oxygen-containing gas can also contain a vaporized alkali metal salt such as CsCl or KCl, etc. which is one of the tools used to control particle growth as described for example in U.S. Pat. No. 5,201,949, the teachings of which are hereby incorporated by reference. Alternatively, in the sulfate process, sulfuric acid and ore containing titanium are dissolved and the resulting solution goes through a series of steps to yield $TiO_2$. "Base $TiO_2$," or oxidation discharge is referred to herein as $TiO_2$ directly removed from an oxidation section of the chloride process. In the sulfate process, "base $TiO_2$" or calciner discharge refers to $TiO_2$ after a calcination step and before any surface treatments are applied. A preferred starting material includes rutile pigment from the chloride process as produced in U.S. Pat. No. 4,214,913, the teachings of which are hereby incorporated by reference. Base $TiO_2$ particles have on the order of less than about 65% by weight of their particle size greater than 0.6 microns as measured by a laser scattering particle size distribution analyzer, as described hereinbelow. It is a desirable aspect in carrying out the invention that a deagglomerated base $TiO_2$ is used. There are numerous references in the literature, in combination or alone, which describe the preparation of a base $TiO_2$ such as U.S. Pat. No. 4,462,979, U.S. Pat. No. 4,661,322, U.S. Pat. No. 4,937,064, and U.S. Pat. No. 3,505,091, the teachings of which are hereby incorporated by reference. The preparation of the deagglomerated base $TiO_2$ will depend on the reactor design, flow rate, temperatures, pressures, production rates, flue diameter, velocity in the flue and rate of cooling the reaction mass, but can be determined readily by testing to obtain the desired effects on agglomeration and particle size. For example, in the chloride process the lower the velocity in the flue, the lower the turbulence thereby achieving the deagglomerated base $TiO_2$. Preferably, large diameter flues aid in obtaining the deagglomerated base $TiO_2$. Typically, such deagglomerated base $TiO_2$ particles have on the order of about less than 50% by weight greater than 0.6 microns, and preferably less than 40% by weight greater than 0.6 microns as measured by a laser scattering particle size distribution analyzer.

Vicscous Shear Processing

The term "viscous shear processing" as used herein means mechanical energy applied to a high solids slurry of high viscosity such that it is barely fluid. The particles interfere with each other as they try to flow. This generates local shear rates that are higher than the thick slurry can tolerate thus producing apparent localized dilatancy, i.e., the rapid increase in shear stress for a slight increase in shear rate. These high shear stress zones then break up the agglomerates resulting in improved dispersion.

Shear stress zones of increased intensity can provide increased energy to break up the more strongly held agglomerates. Shear zones of increased intensity can occur by increasing the fluid viscosity, preferably by increasing the volume fraction of pigment relative to liquid (such as water) volume fraction. Theoretical maximum deagglomeration would occur at highest possible pigment volume fraction, i.e., 92% $TiO_2$ in water converted to weight fraction.

The improved slurry is produced by viscous shear processing of the base $TiO_2$ particles, preferably deagglomerated base $TiO_2$ particles, at a sufficiently high solids content so as to achieve deagglomeration and dispersion of the slurry, while still permitting sufficient fluidity to permit incorporation of the particles into the slurry. Typically, such slurries have at least above about 83% to 92% by weight of solids, preferably above about 83% to 89% by weight of solids and more preferably about 83.5% to 88% by weight of solids.

Commercially available dispersants/surfactants such as sodium and potassium pyrophospate, sodium hexametaphosphate, sodium, potassium or ammonium polyphosphate, aliphatic carboxylic add, dtric add, polyhydroxy alcohols and polyacrylates and the like, and alcohol amines such as 1-amino-2-ethanol, 2-amino-1-ethanol, 1-amino-2-propanol, 2-asnino-2-methyl-1-propanol, diethanolamine, di-isopropanolamine, 2-methylamino-1-ethanol, monoisopropanolamine and triethanolamine and the like, or mixtures thereof are used to produce a stable dispersion. The amount of dispersant/surfactant is not especially critical. Typically, the amount may range from about 0.01 to about 5% by weight.

The process can be carried out continuously or batchwise. For batch slurry processing, the base $TiO_2$ is typically added to a tank, i.e., a vessel which already has water and at least one surfactant present. The amount of the starting materials added will be dependent on the size of the tank. The solids level in the tank is slowly increased over time as slurry viscosity increases. As the desired % solids are finally reached, viscous shear processing is carried out as described below, and is continued until substantially complete and desired deagglomeration and dispersion is obtained. The time for complete and desired deagglomeration to occur once the final solids concentration is obtained can vary but is typically very fast, e.g., about 2 to 30 minutes, preferably 2 to 10 minutes. Then, the slurry typically is diluted to a point sufficient to permit slurry handling and transfer. It will be appreciated by those skilled in the art that the slurry is diluted to a desired percent solids of the resulting final slurry product. For example, it may be desirable that the slurry is diluted to less than about 78% solids, preferably about 70–73% solids, more preferably about 72% solids at a pH greater than 7, preferably between 8 and 10. Additional dispersants may be added during the dilution. The slurry may be screened to remove grit.

A particular advantage of this invention is the operation of a highly efficient continuous process that is preferably operated in a single tank. Dry base $TiO_2$ is continuously and simultaneously added to a tank along with water and at least one dispersant, such that the tank is always maintained at the % solids for good viscous shear processing to occur. Simultaneously with the addition of new material, a portion of the material in the tank is continuously withdrawn by any suitable means, typically from the bottom of the tank by gravity flow, a conveying screw or the like. The material that is withdrawn is immediately diluted with water to give sufficient fluidity for subsequent processing. A dispersant such as an alcohol amine is added simultaneously or separately with the addition of water. Mixing of the viscous material and water takes place in a disperser, separate tank, pump or the like. One advantage of continuous operation is that the process tank is operating at the more efficient viscous shear condition (at final desired solids content). In batch mode, time is spent charging water and surfactants, increasing solids content to obtain sufficient viscous conditions, diluting to final % solids and transferring diluted slurry from the process tank.

In carrying out viscous shear processing of this embodiment, increased agitator speed is used for improved incorporation of the dry pigment particles. Increased speed will enhance the surface vortex which is responsible for drawing the dry pigment particles into the slurry phase for incorporation and subsequent deagglomeration. Increasing the pigment % solids to increase viscous shear can adversely effect the vortex making pigment incorporation more difficult, but this can be offset by increasing the agitator speed. Increased agitator speed has added benefit that the increased speed gives increased shear rate, further enhancing viscous shear processing. Increased agitator energy (power input) is desirable to process the more viscous (higher solids concentration) material with its more intense viscous shear zones. The net result is improved viscous shear conditions that further enhance deagglomeration and result in a final slurry with improved particle size distribution and improved fluid flow properties, as measured by high shear rheology. Specific agitator characteristics depend on the equipment, production rate, blade configuration, etc. For example, agitator tip speed, i.e., linear velocity of an outer tip of a blade on an agitator typically could range from about 4 ft/sec to 55 ft/sec, preferably 6 to 45 ft/sec, and more preferably 14 to 45 ft/sec. Using agitator blades with less pumping action, tip speeds in excess of 55 ft/sec up to about 150 ft/sec may be required. For small scale processing, agitator rpm will be very high but due to small blade diameter, agitator tip speeds could be as low as 4 ft/sec. An energy input of up to about 33 kWh/T of material processed may be used, preferably up to 22 kWh/T, and more preferably between 4 to 11 kWh/T.

By using a less agglomerated base pigment, the increase in agitator power required can be minimized, or the increased agitator power can be used to operate at even higher % solids, giving even further improvement in the viscous shear processing.

In an alternative embodiment of the present invention, viscous shear processing is achieved by increasing the shear rate by using high agitator speed while maintaining the slurry solids at about 83% and below. The lower the solids and less viscous the slurry, the greater the agitator speed required to give shear rates capable of deagglomeration and dispersion. Slurry that has greater fluidity due to its lower solids concentration can be advantageously processed by using greatly increased shear rates. Using a 2 to 25 fold increase in agitator tip speed will produce shear rates capable of viscous shear processing on slurry that is about 78 to 83% solids. Contemplated shear rates are in excess of 28 ft/sec. It is believed that even higher shear rates would be capable of accomplishing comparable viscous shear deagglomeration at further reduced slurry % solids, for example, below 78% solids. It will be appreciated by those skilled in the art that viscous shear processing below 74% solids using a very high agitator speed is possible but not economically advantageous due to extremely high shear rates required. Preferred in carrying out this alternative embodiment is equipment with a narrow gap between a stationary surface and a moving surface such as a colloid mill, high speed disperser, rotor-stator mixer or the like.

Typically, slurries processed above and before a polishing grind and dispersion step have a particle size distribution as defined by a geometric standard deviation (GSD), as described hereinbelow, of less than about 1.70, and have TiO$_2$ particles less than about 40% greater than 0.6 microns, preferably less than 35% greater than 0.6 microns, and more preferably less than 20 to 25% greater than 0.6 microns as measured by a laser scattering particle size distribution analyzer.

Polishing Grind and Dispersion

After viscous shear processing, the diluted slurry may be subjected to a polishing grind and dispersion step. The polishing step is desirable to grind larger particles and further deagglomerate smaller particles for further improved narrow particle size distribution. This may be carried out by a media mill. Contemplated equivalents include a ball mill, colloid mill, attrition mill, Manton-Gaulin mill, high speed disperser, rotor-stator mixer and the like as described in greater detail in *Perry's Chemical Engineers Handbook* (6th ed.) pp 8–30 to 8–46, the teachings of which are hereby incorporated by reference. Preferred is media milling as described in greater detail in U.S. Pat. No. 5,356,470, the teachings of which are hereby incorporated by reference. U.S. Pat. No. 5,356,470 showed that media milling was beneficial primarily for controlling large oversize particles within the 10–44 micron range to give improved board coating smoothness. Polishing media milling produces additional synergistic benefits when used in conjunction with continuous operation of the viscous shear processing for substantially complete dispersion.

Process equipment is commercially available. In carrying out the invention, the titanium dioxide slurry from viscous shear processing is fed into a grind chamber which is filled with beads. Many types of media or different sizes may be used, with one of ordinary skill in the art being able to adjust the media to produce the desired result based on the size distribution of the particles in the starting material. Typically, a media nominal size range is about 0.3 to 2.5 mm in diameter, preferably about 0.6 to 1.6 mm in diameter, and more preferably 0.6 to 1.0 mm. It has been found that smaller size media and/or increased tip speed reduces the size of particles greater than 0.6 microns, particularly between 0.6 to 2.0 microns, preferably between 0.6 to 1.0 microns. The media is stirred in the grind chamber by a series of discs attached to a rotating shaft. Typically, a media mill disc tip speed is in the range of about 1800 to 3200 ft/min, preferably about 2000 to 3000 ft/min and more preferably about 2500 to 2800 ft/min. Average residence times in the media mill will vary depending on the size of the media mill. Typically, average residence times will be between about 1 to 10 minutes, preferably about 2 to 5 minutes on a 200 L size media mill. If a smaller size media mill is used, a shorter residence time can be used. The motion of the media is perpendicular to the direction in which the slurry is pumped, and therefore the TiO$_2$ particles are sheared by the media. Typically, a screen keeps the media inside the grind chamber but allows the TiO$_2$ slurry out of the mill. Optionally, the product of the mill can be further screened.

Typically, slurries processed according to the invention have, subsequent to polishing grind and dispersion, a narrow particle size distribution as defined by the GSD of less than about 1.64, preferably less than about 1.55, more preferably about 1.35 to 1.50. In addition, TiO$_2$ particles having less than about 35% greater than 0.6 microns, preferably less than about 25 and more preferably less than about 10 to 20% greater than 0.6 microns as measured by a laser scattering particle size distribution analyzer may be achieved.

A preferred overall process is as follows:

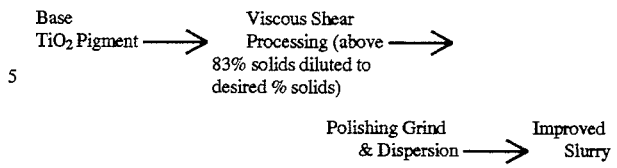

The resulting improved TiO$_2$ slurries are suitable for use in paper, paperboard applications, many paint applications, and aqueous inks. The ability for TiO$_2$ to opacify as measured by light scattering efficiency of TiO$_2$ is in part controlled by particle size and uniform dispersion. Surprisingly, it has been discovered that a narrow particle distribution around or approaching the optimum particle size results in significant enhancements of TiO$_2$ scattering efficiency. When TiO$_2$ slurry made by the process of this invention is incorporated into other and varied paper coating applications, optical efficiency improvement will vary ranging from about 3% to greater than 20% with substantially no adverse impact on other paper attributes such as print gloss, shade, grit, etc.

To give a clearer understanding of the invention, the following Examples are construed as illustrative and not limitative of the underlying principles of the invention in any way whatsoever.

EXAMPLES

COMPARATIVE EXAMPLE 1

Base TiO$_2$ and slurry was made according to the general teachings of U.S. Pat. No. 5,356,470. 682 grams of water was added to a vessel along with about 11 grams of amino alcohol, and about 24 grams of polyacrylate surfactant. Then over about 20 minutes, 2830 grams of the base TiO$_2$ having a particle size of 53 weight % greater than 0.6 microns was added to form a slurry. The slurry with a solids concentration of about 80% was ground for an additional 30 minutes. The vessel contents were diluted to about 72% solids by adding 409 grams of water and adjusted to a pH of about 9 with amino alcohol. The slurry was screened to 325 Mesh (44 microns) to remove grit.

This slurry was then fed to a 1.5 liter Dyno-Mill KDL-Pilot media mill (CB Mills, Buffalo Grove, Ill.). The media mill was filled to 85% capacity with 1.2–1.6 mm SEPR ER 120 (Zirconia:Vitreous Silica) grinding media. The mill was operated at mid-speed setting with a disc tip speed of 2000 ft/min. Slurry was continuously fed at a rate of 0.335 liters/min, and the average residence time was about 2 minutes. The slurry was separated from the media by flowing through the rotating gap media separator at the end of the mill.

COMPARATIVE EXAMPLE 2

Base TiO$_2$ pigment was made as follows. A stream of oxygen preheated to a temperature of 1550° C. was introduced into one end of a tubular reactor operated at 44 psig pressure. An alkali metal salt was added to the oxygen stream to control particle size. Titanium tetrachloride vapor stream containing sufficient aluminum trichloride to provide one per cent Al$_2$O$_3$ in the titanium dioxide was introduced into the reactor at 450° C. PCl$_3$ in a vapor phase was added subsequently. The temperature of the reaction mass, upon completion of the reaction to form TiO$_2$ was in excess of 1500° C. The particle size of the base TiO$_2$ was 56–65 weight % greater than 0.6 microns measured as described below.

Base TiO$_2$ was directly made into an aqueous slurry as follows. 20 t/hr of TiO$_2$ were added to a continuously stirred tank, along with about 5 t/hr of water, 180 pph amino alcohol, and 116 pph polyacrylate. The tank was operated with a mixer tip speed of 28 ft/sec, a typical power input of 6 kWh/T TiO$_2$, and average residence time of about 30 minutes, with a typical solids concentration of 80–81% to achieve slurry deagglomeration. The discharge of the tank was continuously diluted with about 3 t/hr of water, and about 90 pph amino alcohol is added to deliver a product slurry with about 72% solids and a pH at about 9. The slurry was screened to 325 Mesh (44 microns) to remove grit.

This slurry was then fed to a HM-200 media mill (Premier Mill Corp., Reading Pa.). The media mill was filled to about 85% capacity, with 1.2–1.6 mm SEPR ER 120 (Zirconia:Vitreous Silica) grinding media. Slurry was fed at a rate of 10 gpm, and the mill was operated with a disc tip speed of 2000 ft/min. The average residence time was about 3 minutes. The power input was 7.2 kWh/T. Exiting the mill, the slurry was separated from the media by media retaining screens that are part of the mill.

EXAMPLE 3

Base TiO$_2$ pigment was made the same as Comparative Example 2 except at the exit of the reactor, the flue diameter was immediately expanded by 60% and the reactor pressure was increased by up to about 11% thereby decreasing linear velocity by about 40% from Comparative Example 2. A 14 ppm increase of an alkali metal salt was added to the oxygen stream to control the particle size. These modifications reduced the base pigment agglomeration. The particle size of the deagglomerated base TiO$_2$ was 35–40 weight % greater than 0.6 microns measured as described below.

The deagglomerated base TiO$_2$ was directly made into an aqueous slurry as follows. The 20 t/hr of TiO$_2$ were added to a continuously stirred tank, along with about 4 t/hr of water, 180 pph amino alcohol, and 116 pph polyacrylate. The tank was operated with a mixer tip speed of about 33 ft/sec, a typical power input of 7.5 kWh/T TiO$_2$, and average residence time of about 30 minutes, with a typical solids concentration of 83–85% to achieve slurry deagglomeration and dispersion. The discharge of the tank was continuously diluted with about 4 t/hr of water, and about 90 pph amino alcohol is added to deliver a product slurry with about 72% solids and a pH at about 9. The slurry was screened to 325 Mesh (44 microns) to remove grit.

The slurry was then fed to a HM-200 media mill as Comparative Example 2 except the improved rheological properties of the slurry reduced the media mill power required to 6.9 kWh/T.

EXAMPLE 4

Same as Example 3 except the media mill was filled to 85% capacity, with 0.8–1.0 mm SEPR ER 120 (Zirconia:Vitreous Silica) grinding media. Slurry was fed at a rate of 10 gpm, and the mill was operated with an increased disc tip speed of 2500 ft/min and the power input was 9.1 kWh/T.

EXAMPLE 5

Base TiO$_2$ pigment was made according to Example 3. The particle size of the deagglomerated base pigment was 38 weight % greater than 0.6 microns.

The base pigment was converted into a slurry batchwise. Pre-mixed surfactant was prepared, consisting of 20 grams of water, about 4 grams of polyacylate, and about 2 grams of amino alcohol. Water (63 grams) was added to a vessel. Agitation was provided by an IKA mixer using a 2.1" diameter blade operating at 700 rpm (6 ft/sec). Base pigment (500 grams) along with surfactant premix was added to the vessel. Addition rate was slowed as slurry solids and viscosity increased resulting in 85.6% solids. Agitation was continued for 5 minutes to obtain a uniform deagglomerated slurry. Then 100 grams of water and about 1 gram of amino alcohol were added to dilute the slurry to about 73% solids.

After 325 mesh screening, the slurry was media milled using a 1.5 liter Dynomill. The mill was filled to 85% capacity with 0.8 to 1.0 mm grinding media. The disc tip speed was 2800 ft/min.

EXAMPLE 6

Batchwise slurry was produced according to Example 5 except that additional pigment and surfactant premix was used to further increase the % solids to 86.4% solids for viscous shear processing. The slurry was diluted, screened and media milled as in Example 5.

PARTICLE SIZE MEASUREMENTS (a) Laser Scattering Particle Size Distribution Analyzer The particle size of the base TiO$_2$ and the slurry product was measured using a laser scattering particle size distribution analyzer, LA-900 instrument (available from Horiba, Kyoto, Japan), calibrated according to the manufacturer's recommendations. The base TiO$_2$ prior to dispersion in the tank was prepared as a 3% solids slurry in 0.2 g/L TKPP solution. This mixture was sonicated for 10 minutes on a 7 power setting using a Sonicator Ultrasonic Liquid Processor Model XL 2020 (available from Heat Systems, Inc., Farmingdale, N.Y.) and then the particle size of the base TiO$_2$ was measured using the Horiba instrument described above. The slurry product was taken directly and mixed with water to a point the LA-900 would operate, as recommended by the manufacturer and then the particle size was measured using the Horiba instrument described above. Average (mass median) particle size is reported as $D_{50}$. The %>0.6 is the fraction of particles greater than 0.6 microns in size, that is, the amount of particles on a weight basis that are >0.6 microns and would be expected to be deficient in optical efficiency. The width of the particle size distribution is given as the Geometric Standard Deviation (GSD) and is defined as the square root of $D_{84}/D_{16}$. 16 weight % of particles are smaller in size than the value called $D_{16}$, and 84 weight % of particles smaller in size than the value called $D_{84}$. Ideal mondisperse particles have a minimum GSD of 1.0.

(b) X-ray Sedimentometer

Previously, particle size measurements have been provided with a Micrometrics 5000 Analyzer, SEDIGRAPH® (Micrometritics Instrument Corp.), i.e., x-ray sedimentometer, which gives reproducible results, but different absolute values. All data herein and in the claims were determined using the Horiba laser scattering particle size distribution analyzer, but typical results are provided below for ease of comparison of Horiba (1) and SEDIGRAPH® (2) data.

| Sample | $D_{50}(1)$ | $D_{50}(2)$ | % > 0.6 (1) | % > 0.6(2) |
|---|---|---|---|---|
| Base | .68 | .39 | 58 | 25 |
| Deagglomerated Base | .52 | .36 | 39 | 12 |

The slurry samples were prepared in a typical paper coating formulation and coated on Mylar® to measure the optical properties of the coating at 460 and 550 nm. Measurement at 550 nm, a wavelength in the middle of the green region of the visible spectrum, provides a good measure of opacity of the paper coating. Opacity is the primary attribute provided by $TiO_2$ in paper applications. $TiO_2$ also contributes to paper brightness and results are reported in the blue region (460 nm) where brightness was measured. Comparison of $TiO_2$-containing coatings versus $TiO_2$-free coatings allows calculation of the optical scattering efficiency also referred to as hiding power of the titanium dioxide present in the coating, reported as $S(TiO_2)$. The relative efficiency of the $TiO_2$ is determined by assigning the Comparative Example 2 a value of 100. Alternatively, relative scattering efficiency can be compared by measuring optical density of dilute suspensions in water.

Below in Table 1 are the data for the Comparative Examples 1–2 and Examples 3–6 in paper coatings.

TABLE 1

| Description | Particle Size Distribution | | | $S(TiO_2)$ | | | |
|---|---|---|---|---|---|---|---|
| | | | | @ 460 nm | | @ 550 nm | |
| | $D_{50\mu}$ | % > 0.6 | GSD | (m²/g) | Relative | (m²/g) | Relative |
| Comparative Example 1 | .445 | 29.4 | 1.64 | .71 | 107 | .57 | 104 |
| Comparative Example 2 | .483 | 33.3 | 1.61 | .663 | 100 | .550 | 100 |
| Example 3 | .380 | 16.4 | 1.50 | .754 | 114 | .596 | 108 |
| Example 4 | .367 | 13.2 | 1.46 | .770 | 116 | .598 | 109 |
| Example 5 | .338 | 8.8 | 1.42 | .788 | 119 | .630 | 114 |
| Example 6 | .322 | 6.7 | 1.40 | .812 | 122 | .649 | 118 |

Comparative Examples 1 and 2 show that the productivity advantages of continuous viscous shear processing are realized at a sacrifice in scattering efficiency. The examples of this invention show that even higher light scattering performance can be achieved while maintaining the productivity advantages of the continuous process. Relative to Comparative Example 2, Example 3 demonstrated a 8% improvement in opacification and 14% efficiency of $TiO_2$ in the blue region of the spectrum. Example 4 provides further improvements. Example 5 demonstrated a further 5% improvement obtained by processing at 85.6% solids in viscous shear processing of slurry. Example 6 showed an even further improvement by processing at elevated % solids.

The particle size distribution between 0.6–1.0 microns and 1.0–2.0 microns was determined using the same technique as described above. The data are summarized below in Table 2.

TABLE 2

| Example | %0.6–1.0 microns | %1.0–2.0 microns |
|---|---|---|
| Comparative Example 1 | 19.8 | 9.1 |
| Comparative Example 2 | 23.2 | 10.1 |
| Example 3 | 12.6 | 3.8 |
| Example 4 | 10.6 | 2.6 |
| Example 5 | 8.3 | 1.7 |
| Example 6 | 6.2 | 1.0 |

RHEOLOGY

Another property improvement is reduction of high shear viscosity. Samples of the slurry feed to the media mill and slurry product were measured for viscosity using a Hercules High Shear Viscometer at a shear rate of about 10,000 reciprocal seconds. Results are reported below in Table 3.

TABLE 3

| | High Shear Viscosity | |
|---|---|---|
| Example | Slurry Feed to Media Mill | Slurry Product |
| Comparative Example 1 | 33.4 | 19.4 |
| Comparative Example 2 | 46.3 | 24.1 |
| Example 3 | 30.8 | 20.9 |
| Example 4 | 30.8 | 18.8 |
| Example 5 | NM* | 10.6 |
| Example 6 | NM | 11.6 |

*NM = not measured

EXAMPLES 7A AND 7B

Samples were prepared using the same base pigment as Example 5 and 6. For Example 7A the slurry step was identical to Example 5 except that the batch viscous shear processing was done at 83.7% solids. For Example 7B a continuous viscous shear processing was used similar to Example 3. Both examples were media milled using the method of Example 5. These examples were measured for particle size distribution, prior to and subsequent to media milling. Results are provided in Table 4.

TABLE 4

| | Particle Size Distribution | | | | | | % Reduction | | | % Improvement in Hiding Power |
|---|---|---|---|---|---|---|---|---|---|---|
| | Media Mill Feed | | | After Media Milling | | | From Media Milling | | | |
| Ex. | $D_{50}$ | % > 0.6 | GSD | $D_{50}$ | % > 0.6 | GSD | $D_{50}$ | % > 0.6 | GSD | |
| 5 | .342 | 10.0 | 1.434 | .338 | 8.8 | 1.421 | 1.7% | 12.0% | 0.9% | 1.2 |
| 6 | .336 | 9.0 | 1.429 | .322 | 6.7 | 1.403 | 4.1% | 25.5% | 1.9% | 1.4 |
| 7A | .383 | 16.9 | 1.509 | .373 | 14.5 | 1.474 | 2.6% | 14.2% | 2.6% | 2.0 |
| 7B | .417 | 23.2 | 1.573 | .379 | 15.8 | 1.490 | 9.1% | 31.8% | 6.5% | 5.0 |

The benefit of media milling continuous processed slurry (Example 7B) is significantly greater than media milling batch processed slurry as shown by the much larger relative change in particle size distribution that occurs from media milling.

Batch processing at increased % solids (Example 5 and 6) showed only minor improvement in particle size distribution from media milling, demonstrating that the relative improvement from media milling is less as viscous shear processing is operated at increased % solids.

EXAMPLE 8

Base TiO₂ (as used in Examples 5 to 7) was batch processed. An IKA mixer with a 3.4" diameter blade operated at 700 rpm for a 10.3 ft/sec blade tip speed was used to produce a slurry using 2500 grams of base pigment. A total of 569 grams of water was initially added to the vessel along with about 7 grams of alcohol amine and 7 grams of polyacrylic surfactant. After pigment addition was competed, the slurry which was analyzed at 81.7% solids. The slurry was mixed for an additional 5 minutes to assure uniform deagglomeration. A 350 gram sample was withdrawn for dilution, screening and pH adjustment to 9.

The remaining slurry was than subjected to 1400 rpm agitator speed (about 21 ft/sec tip speed). As the speed was increased, viscous shear processing lasting for about 1 minute occurred as the increased shear rate produced further deagglomeration. After mixing for an additional two minutes to assure uniformity, a farther 350 gram sample was taken. The remaining material was then mixed for 5 minutes using a 3 inch diameter agitator blade at 3000 rpm, for a 40 ft/sec tip speed. Again a 350 gram sample was removed. Finally, the remaining material was subject to a 257 ft/sec tip speed in a Waring Blender with a 3 inch diameter blade operated at 18000 rpm. All samples were diluted to 72% solids for high shear rheology measurements. The high shear theology and particle size were run on the samples.

EXAMPLE 9

An identical procedure to Example 8 was followed, except that more water was used for the initial slurry preparation so that the solids concentration was 80%. A further identical procedure was followed, except the solids concentration was only 78%. The samples were not media milled.

Sample results are provided in Table 5. Examples 7A and 5 results are prior to media milling and are provided in Table 5.

TABLE 5

| Ex. | Solids | ft/sec | High Shear Viscosity (cp) | Particle Size Distribution | | | Relative Hiding Power |
|---|---|---|---|---|---|---|---|
| | | | | D50 | CT | GSD | |
| 8 | 81.7% | 10 | 19.7 | .407 | 21.4 | 1.553 | 105 |
| | | 20 | 18.2 | .382 | 16.7 | 1.502 | 107 |
| | | 40 | 14.8 | .365 | 13.4 | 1.467 | 109 |
| | | 257 | 13.7 | .355 | 11.3 | 1.440 | 110 |
| 9 | 80% | 20 | 19.8 | .400 | 19.7 | 1.541 | NM* |
| | | 40 | 17.1 | .392 | 18.1 | 1.516 | NM |
| | | 257 | 16.0 | .382 | 16.2 | 1.490 | NM |
| | 78% | 20 | 22.01 | .463 | 30.0 | 1.608 | 102 |
| | | 40 | 20.1 | .436 | 25.6 | 1.576 | NM |
| | | 257 | 18.2 | .412 | 21.0 | 1.532 | 107 |
| 7A | 83.7% | 10 | 15.0 | .383 | 16.9 | 1.509 | 109 |
| 5 | 85.6% | 10 | 10.6 | .342 | 10.0 | 1.434 | 112 |

NM* = not measured

Comparable viscous shear deagglomeration to the material processed at 85.6% occurred at only 82% solid but required 25 times the shear rate. Using only 80% solids, but operating at 25 times the shear rate gave comparable performance to 83.7% processed material. Even at only 78% solids, operating at 257 ft/sec tip speed gave acceptable product. This demonstrated that using greatly increased shear rate at lower slurry % solids can result in improved properties.

Having thus described and exemplified the invention with a certain degree of particularity, it should be appreciated that the following Claims are not to be limited but are to be afforded a scope commensurate with the wording of each element of the Claims and equivalents thereof.

What is claimed is:

1. A process for preparing an improved TiO₂ slurry directly from base TiO₂, comprising: viscous shear processing a slurry of base TiO₂ particles, wherein less than about 65 weight % of the base TiO₂ particles have a particle size greater than 0.6 microns, at a solids content above 83% by weight, so as to achieve deagglomeration and dispersion of the slurry, while still permitting sufficient fluidity to permit incorporation of the particles into the slurry.

2. The process of claim 1 wherein the process is carried out continuously or batchwise.

3. The process of claim 2 wherein the base TiO₂ is rut fie produced by a chloride process.

4. The process of claim 1, claim 2 or claim 3, further comprising the step of: grinding and dispersing the viscous shear processed slurry until the TiO₂ particles have a narrow particle size distribution as defined by a geometric standard deviation of less than about 1.64.

5. The process of claim 4 wherein less than about 35 weight % of the TiO₂ particles have a particle size greater than 0.6 microns.

6. The process of claim 4 wherein the grinding and dispersing of the viscous shear processed slurry is carried out with a media mill.

7. The process of claim 1 wherein viscous shear processing is carried out with an agitator tip speed of about 4 to 150 ft./sec.

8. The process of claim 7 wherein viscous shear processing is carried out with an energy input of up to about 33 kWh/T TiO₂.

9. The process of claim 1 wherein the solids content is above 83% and less than or equal to 89% by weight.

10. The process of claim 6 wherein the media have a diameter size in the range of between about 0.3 to 2.5 mm and the media mill has a disc tip speed of about 1800 to 3200 ft./min.

11. A process for enhancing the optical efficiency of TiO₂ slurries on paper and paperboards, comprising the steps of:
    (a) preparing base TiO₂ particles, wherein less than about 50 weight % of the base TiO₂ particles have a particle size greater than 0.6 microns;
    (b) slurrying the base TiO₂ particles at a solids content of above 83% and less than or equal to 92% by weight, at an agitator speed and agitator power so as to achieve viscous shear deagglomeration and dispersion of the slurry, while still permitting sufficient fluidity to permit incorporation of the particles into the slurry;
    (c) diluting the slurry to a point sufficient to permit slurry handling and transfer; and
    (d) media milling the slurry with media having a diameter size in the range of between about 0.6 to 1.6 mm at a media mill disc tip speed of about 2000 to 3000 ft/min until the TiO₂ particles have a narrow particle size distribution as defined by a geometric standard deviation of less than about 1.64 and less than about 30 weight % of the TiO₂ particles have a particle size greater than 0.6 microns.

12. The process of claim 11 wherein the process is carried out continuously.

13. The process of claim 12 wherein step (c) occurs simultaneously as slurry is continuously removed from step (b).

14. A TiO₂ slurry made by the process of claim 4 or claim 5 or claim 11 wherein the optical efficiency of the TiO₂ is increased at least 3% when incorporated into paper and paperboards.

15. A process for preparing aqueous $TiO_2$ slurries, comprising the steps of:

(a) preparing base $TiO_2$ particles, wherein less than about 40 weight % of the base $TiO_2$ particles have a particle size greater than 0.6 microns;

(b) viscous shear deagglomerating and dispersing the $TiO_2$ particles from step (a) in the presence of water and at least one dispersant at a solids content of above 83 and less than or equal to 88% by weight, at a sufficient agitator speed so as to achieve substantial incorporation of the particles into the slurry;

(c) diluting the slurry to a solids contents of less than about 78% by weight; and (d) media milling the slurry with media having a diameter size in the range of between about 0.6 to 1.0 mm at a media mill disc tip speed of about 2500 to 2800 ft/min. until the $TiO_2$ particles have a narrow particle size distribution as defined by a geometric standard deviation of less than about 1.55 and less than about 25 weight % of the $TiO_2$ particles have a particle size greater than 0.6 microns.

* * * * *